United States Patent
Tang

(10) Patent No.: US 11,418,364 B2
(45) Date of Patent: Aug. 16, 2022

(54) DETERMINING A SESSION KEY USING SESSION DATA

(71) Applicant: Combined Conditional Access Development & Support, LLC, San Diego, CA (US)

(72) Inventor: Lawrence W. Tang, San Diego, CA (US)

(73) Assignee: Combined Conditional Access Development And Support, LLC, Philadelphia, PA (US)

(*) Notice: Subject to any disclaimer, the term of this patent is extended or adjusted under 35 U.S.C. 154(b) by 78 days.

(21) Appl. No.: 15/615,930

(22) Filed: Jun. 7, 2017

(65) Prior Publication Data

US 2018/0357432 A1 Dec. 13, 2018

(51) Int. Cl.
*H04L 67/14* (2022.01)
*H04L 12/40* (2006.01)
*H04L 9/40* (2022.01)
*H04L 9/08* (2006.01)
(Continued)

(52) U.S. Cl.
CPC ........ *H04L 12/40104* (2013.01); *G06F 21/10* (2013.01); *H04L 9/088* (2013.01); *H04L 9/0822* (2013.01); *H04L 9/0866* (2013.01); *H04L 9/3297* (2013.01); *H04L 63/0435* (2013.01); *H04L 63/061* (2013.01); (Continued)

(58) Field of Classification Search
CPC ... G06F 21/62; G06F 21/10; H04L 12/40104; H04L 67/14; H04L 9/0819; H04L 9/0861; H04L 9/0844; H04L 63/045; H04L 9/0825; H04L 63/061; H04L 63/0876; H04L 9/0841; H04L 9/3242; H04L 9/3297; H04L 9/0866; H04L 9/088; H04L 9/0822; H04L 63/0435; H04L 63/0815; H04L 2463/062; H04L 2463/061
See application file for complete search history.

(56) References Cited

U.S. PATENT DOCUMENTS

| 6,681,017 B1 | 1/2004 | Matias et al. |
| 6,934,392 B1 | 8/2005 | Vanstone |
| 6,941,454 B1 | 9/2005 | Spraggs |

(Continued)

OTHER PUBLICATIONS

"Diffie-Hellman key exchange," Wikipedia, retrieved Jun. 24, 2016. <https://en.wikipedia.org/wiki/Diffie%E2%80%93Hellman_key_exchange>.

*Primary Examiner* — Michael Simitoski
*Assistant Examiner* — Hany S. Gadalla
(74) *Attorney, Agent, or Firm* — Banner & Witcoff, Ltd.

(57) ABSTRACT

The various examples are directed to establishing a secure session between a device and a server. The device and the server may establish a session key. The session key may be used for encrypting data. After authenticating the session key, the server may transmit secure session data to the device, and the device may store the secure session data. The server may transmit information for deriving, based on secure session data, the session key to a different server. The device may transmit the secure session data to the server, or to the different server, to re-establish the secure session. The different server may derive, using the information and based on the secure session data, the session key. The different server may re-establish, using the session key, the secure session.

20 Claims, 6 Drawing Sheets

(51) Int. Cl.
  *G06F 21/10*      (2013.01)
  *H04L 9/32*       (2006.01)
(52) U.S. Cl.
  CPC .......... *H04L 63/0815* (2013.01); *H04L 67/14* (2013.01); *H04L 2463/061* (2013.01); *H04L 2463/062* (2013.01)

(56) References Cited

U.S. PATENT DOCUMENTS

| | | | |
|---|---|---|---|
| 6,985,953 B1 | 1/2006 | Sandhu et al. | |
| 7,039,021 B1 * | 5/2006 | Kokudo | H04L 63/08 370/310 |
| 7,336,785 B1 | 2/2008 | Lu et al. | |
| 7,350,081 B1 * | 3/2008 | Best | G06F 21/10 380/279 |
| 9,397,828 B1 * | 7/2016 | Lieber | H04L 9/083 |
| 10,951,652 B1 * | 3/2021 | Sharifi Mehr | H04L 63/0807 |
| 2002/0165912 A1 | 11/2002 | Wenocur et al. | |
| 2003/0028770 A1 | 2/2003 | Litwin et al. | |
| 2003/0033523 A1 | 2/2003 | McNulty et al. | |
| 2003/0051129 A1 | 3/2003 | Razdan et al. | |
| 2003/0091013 A1 | 5/2003 | Song et al. | |
| 2005/0287990 A1 | 12/2005 | Mononen et al. | |
| 2006/0184796 A1 * | 8/2006 | Fahrny | H04N 21/26606 713/176 |
| 2006/0212706 A1 * | 9/2006 | Jiang | H04L 9/3247 713/176 |
| 2006/0274899 A1 * | 12/2006 | Zhu | H04L 9/083 380/281 |
| 2006/0288213 A1 | 12/2006 | Gasparini et al. | |
| 2007/0064936 A1 * | 3/2007 | Kasahara | H04L 9/0838 380/45 |
| 2007/0192842 A1 | 8/2007 | Beaulieu et al. | |
| 2008/0114983 A1 | 5/2008 | Sherkin et al. | |
| 2008/0234047 A1 * | 9/2008 | Nguyen | G07F 17/32 463/42 |
| 2010/0189265 A1 * | 7/2010 | Ito | H04L 9/3265 380/285 |
| 2010/0266127 A1 * | 10/2010 | Rouse | H04N 21/26613 380/278 |
| 2011/0145577 A1 * | 6/2011 | Fahrny | H04N 21/26606 713/168 |
| 2011/0231651 A1 * | 9/2011 | Bollay | H04L 63/166 713/152 |
| 2011/0235806 A1 * | 9/2011 | Fukuda | H04L 9/0825 380/282 |
| 2011/0258450 A1 * | 10/2011 | Tian | H04L 9/0838 713/168 |
| 2013/0024686 A1 * | 1/2013 | Drucker | H04L 9/083 713/155 |
| 2013/0212413 A1 * | 8/2013 | Berndt | H04L 12/12 713/310 |
| 2014/0044265 A1 * | 2/2014 | Kocher | H04L 9/083 380/277 |
| 2015/0082019 A1 * | 3/2015 | Waisbard | H04L 63/0435 713/150 |
| 2016/0013935 A1 * | 1/2016 | Pahl | H04L 9/14 713/171 |
| 2016/0212461 A1 * | 7/2016 | James | H04N 21/25875 |
| 2016/0359551 A1 * | 12/2016 | Roy | H04B 7/2041 |
| 2017/0163607 A1 * | 6/2017 | Skuratovich | H04L 9/0819 |
| 2018/0167208 A1 * | 6/2018 | Le Saint | H04L 9/0844 |
| 2018/0183581 A1 * | 6/2018 | Elbaz | H04L 63/061 |

* cited by examiner

DETERMINING A SESSION KEY USING SESSION DATA

BACKGROUND

Securing data against unauthorized access is more important than ever in today's digital age, but this can be a complicated process. While individual session keys may be established between a client and a server to secure their communications against eavesdroppers, it can be computationally expensive to generate a new session key for every communication. There remains an ever-present need for efficient ways to manage the generation of keys that can be used to secure communications.

SUMMARY

Methods and apparatuses relating to managing session keys in systems that use multiple servers (e.g., a pool of servers) to service clients are described. A first server may field an initial request from a client, and may generate a session key with that client, and that session key may be used by both of them to secure their communications. The first server may also cause the client to store some information that can be used by a second server to recreate the session key if needed. If/when the client issues a new request to the second server (e.g., if the first server has become unavailable, or the client's request is sent to the second server, instead of the first, due to load balancing), the client can provide that information to the second server, and the second server can use that information to recreate the session key that was initially created between the client device and the first server. With this approach, the client device is not required to undergo a full new key generation process when communicating with the second server, and the first and second servers are not required to store the session key on their own, since it can just be recreated using the information from the client. This may help to reduce security risks and complexities that would arise if the servers simply stored copies of the session key on their own.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Figure 1:
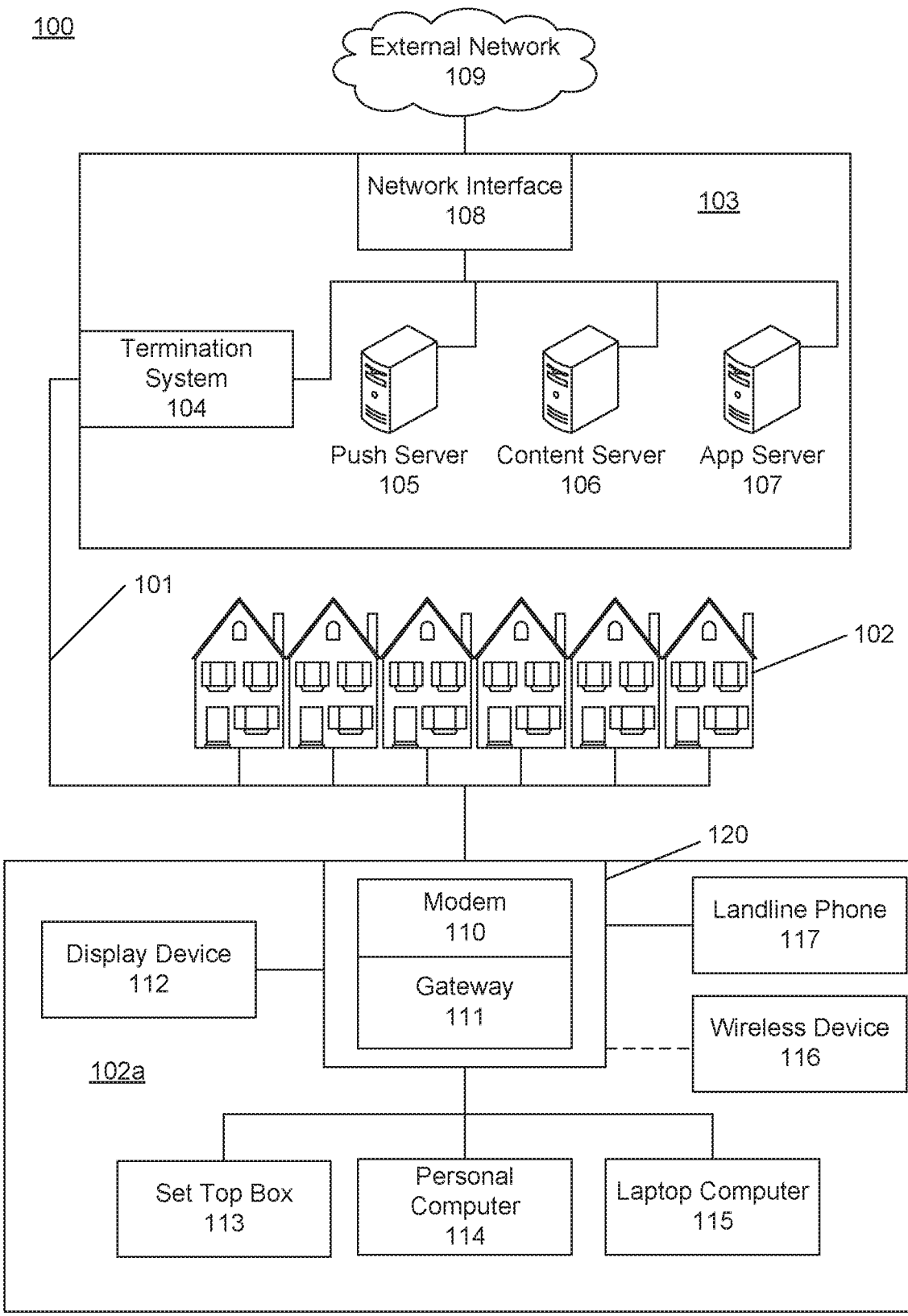
FIG. 1 shows an example communication network on which various features described herein may be implemented.

FIG. 1 shows an example communication network 100 on which many of the various features may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

In one implementation, there may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of links 101 and backend devices such as servers 105-07. The interface 104 may be as specified in a standard, such as the Data Over Cable Service Interface Specification (DOCSIS) standard, published by Cable Television Laboratories, Inc. (a.k.a CableLabs), or it may be a similar or modified interface instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. For example, the local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate and retrieve requested content, to encrypt the content, and to initiate delivery, in one example, by streaming of the content to the requesting user or device. The local office 103 may include a load balancer (not illustrated) to route requests for content to one of the content servers 106. For example, the load balancer might route the requests for content based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. For example, an application server may be responsible for collecting television program listings information and generating a data download for electronic program guide listings. In some aspects of the disclosure, the application server 107 may be responsible for monitoring user viewing habits and collecting that information for use in selecting advertisements. In other examples, the application server 107 may be responsible for formatting and inserting advertisements in a video stream being transmitted to the premises 102. Although shown separately, one of ordinary skill in the art will appreciate that the push server 105, content server 106 and application server 107, may be combined. Further, here the push server 105, the content server 106, and the application server 107 are shown generally, and it will be understood that they may each contain memory storing computer executable instructions to cause a processor to perform steps described herein or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premise 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premise 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone-DECT phones, mobile phones, mobile televisions, personal digital assistants (PDA), landline phones 117, which may be Voice over Internet Protocol (VoIP) phones, and any other desired devices. One or more of these devices may be used to store a secure cookie, for example, an encrypted cookie, containing the unique user identification information used to derive the session key on the server. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

As described below and in FIGS. 3-6, the content servers 106 may establish a secure session with one or more of the devices 110-17. The secure session may be used for content delivery. In one implementation, a first content server 106 may establish a session key with one of the devices 110-17. The one of the devices 110-17 may issue a new request to a second content server 106 due to load balancing and/or unavailability of the first content server 106. Rather than prompting the second content server 106 to go through the entire re-establishment of the session key, the methods provide a way for the first content server 106 to share the session key with the second content server 106, thus creating an extended duration session key, without having to actually transmit the session key between the servers.

For example, the one of the devices 110-17 may then communicate with the second content server 106. The communication, to the second content server 106, may comprise a secure data file comprising the session key and client identification information that may identify the one of the devices 110-17. The second content server may transmit, to a shared server configured to communicate with at least the first content server 106 and the second content server 106, the client identification information. The shared server may derive, based on the client identification information and via a key ladder, a decryption key. The shared server may transmit, to the second content server 106, the decryption key. The second content server 106 may derive, via decryption of the secure data file using the decryption key, the session key. The second content server 106 may use the session key to validate a request and/or communicate with the one of the devices 110-17. This may allow for secure authentication of a client device while eliminating the need for a central repository shared between servers in a network and used to store secure session data to be distributed amongst a plurality of servers. Further, this allows for increased security and user privacy by eliminating the potential for a breach of the central repository.

Figure 2:
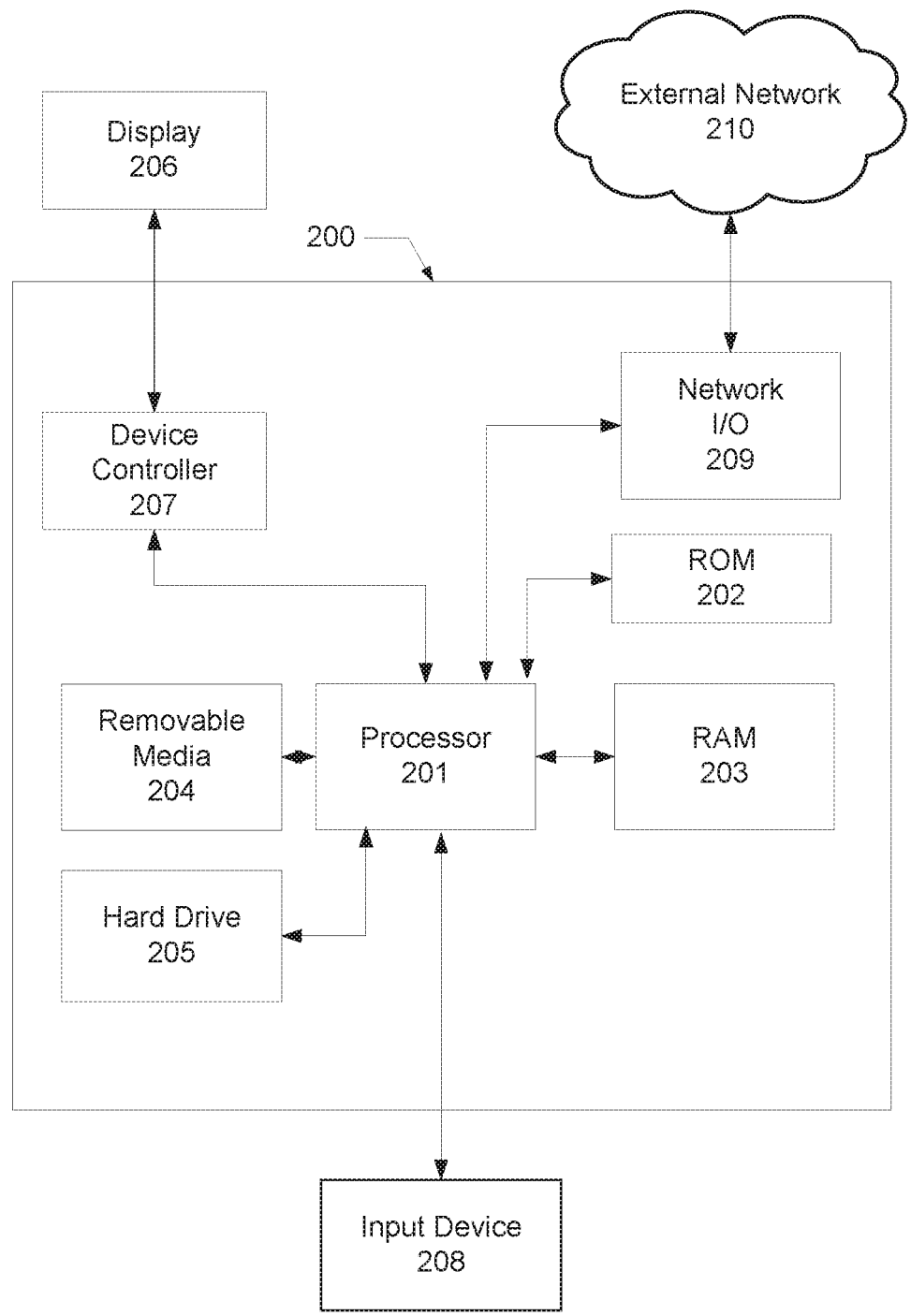
FIG. 2 shows an example computing device that may be used to implement any of the methods.

FIG. 2 shows an example computing device that may be used to implement any of the methods. A computing device 200 may include one or more processors 201, which may execute instructions of a computer program to perform any of the features. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, wireless interface, or a combination of the two. In some examples, the network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the shown components may be implemented as software. Modifications may be made to add, to remove, to combine, or to divide components of the computing device 200 as desired. Additionally, the components shown may be implemented using basic computing devices and components, and the same components (e.g., processor 201, ROM storage 202, display 206, etc.) may be used to implement any of the other computing devices and components described herein. For example, the various components may be implemented using computing devices having components such as a processor executing computer-executable instructions stored on a computer-readable medium, as shown in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
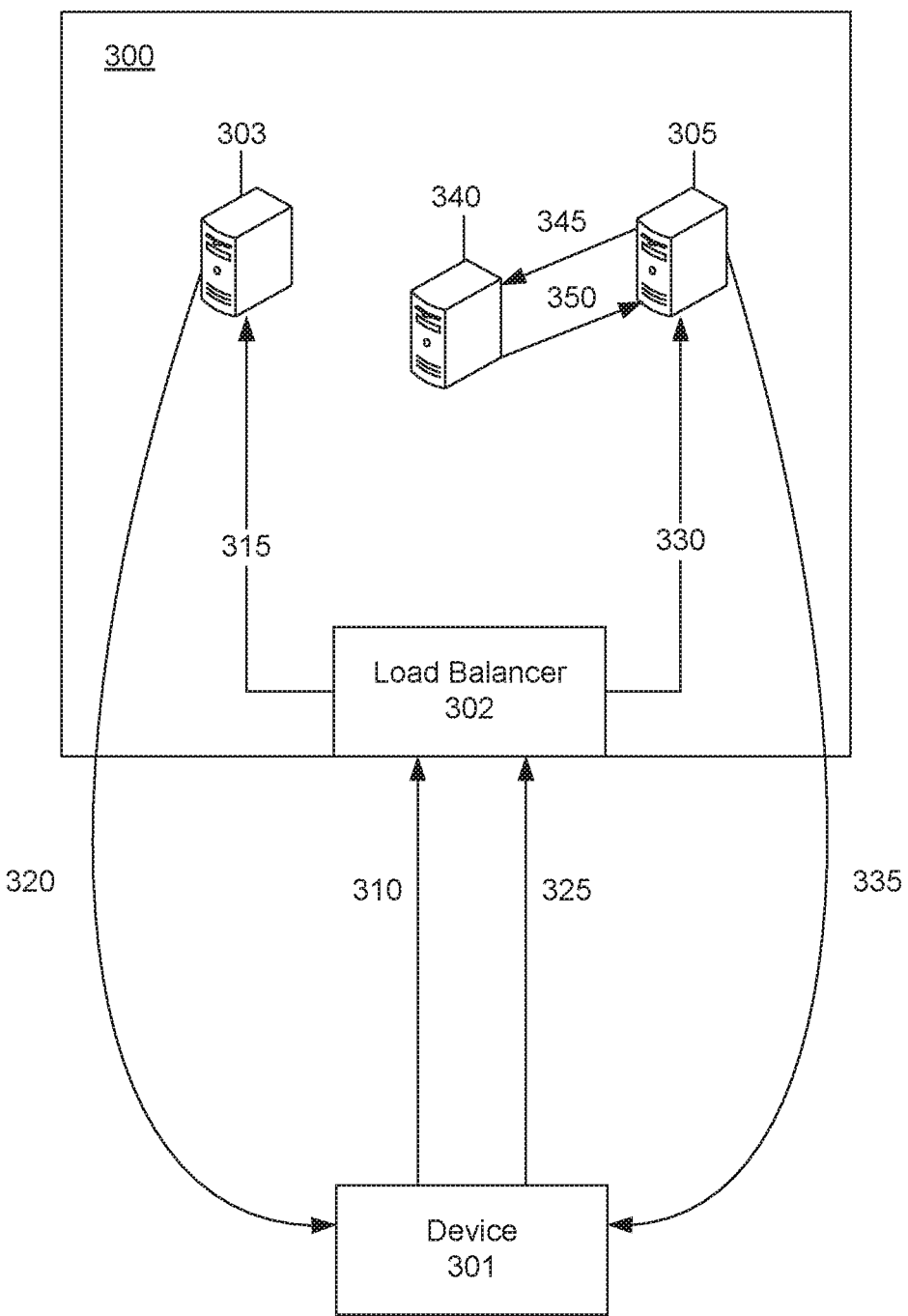
FIG. 3 shows a diagram of secure communications between a device and a plurality of servers.

FIG. 3 shows a diagram of secure communications between a device 301 which may comprise at least one of: the personal computer 114, the laptop computer 115, and the wireless device 116, and a plurality of servers which may comprise at least one of the servers 105-107. These devices may comprise any or all of the components described in the hardware configuration of the computing device 200. A data center 300 may include a plurality of servers, such as servers 303 and 305. For example, the servers 303 and 305 may comprise content servers such as the content server 106. The data center 300 may include a load balancer 302. The load balancer 302 may be configured to distribute requests for content between the servers 303 and 305. For example, the load balancer 302 may route requests for content based on the availability or the utilization of each of the servers 303 and 305. Although shown as located in a data center 300, the load balancer 302 and the servers 303 and 305 may be located in any location, or in a plurality of locations. For example, the server 303 may be in a first data center 300 and the server 305 may be in a second data center 300. The servers 303 and 305 may be able to communicate with each other directly, may communicate via the load balancer 302, or any combination thereof.

A device 301 may establish a secure session with one or more of the servers 303 and 305.

To establish the secure session, a first key exchange may be performed between the device 301 and the server 303 to determine a first session key, thereby establishing a first secure session. If the device 301 then communicates with the server 305, the device 301 and the server 305 may perform a second key exchange, to determine a second session key, thereby establishing a second secure session. To improve efficiency and reduce delay associated with a transmission of a response to subsequent requests, the server 305 may re-derive and reuse the first session key without engaging in a subsequent key exchange similar to that of the first key exchange. By avoiding this additional communication, the server 305 may make it harder for a hacker to intercept and decode the session key. Furthermore, the server 305 may eliminate delay associated with the second key exchange.

The server 305 may receive a request for content, containing client identification information (such as an authentication certificate/signature pair), and a secure data file. In this example, the server 305 may transmit the client identification information, via transmission 345 to a shared server 340, which may derive, using the client identification information as an input to a stored key ladder, a decryption key. The server 305 may use the decryption key to decrypt the secure data file, comprising the first session key and/or session data that the server 305 may use to derive the first session key. The server 305 may use the first session key to authenticate the request for content. In this example, the server 305 may be able to derive the first session key and reestablish the first secure session, with the device 301, using the methods. By determining the first session key via decryption of the secure data file, rather than performing another key exchange to generate a second session key, the first secure session may be extended, thereby reducing the performance cost of establishing multiple secure sessions. Furthermore, by decrypting the secure data file from the client to unlock the session key, the server 305 eliminates the role of a central repository which may contain the session key and/or secure session data. Maintenance of the central repository and its security may be difficult and expensive, and thus by eliminating the central repository from the process of deriving extendable session keys, this process may be more secure and efficient overall.

The device 301, such as one of the devices 110-17, may send a request 310 for content to the load balancer 302. For example, the request 310 for content may comprise an indicator of content or an indicator of a service. The request 310 for content may comprise an identifier, such as an identifier associated with the device 301. For example the identifier may comprise information associated with the device 301 such as a Media Access Control (MAC) address, a chassis serial number, a CPU serial number, and/or a user identifier. In one example, the identifier might not be alterable by the user. The request 310 for content may comprise a timestamp.

The load balancer 302 may receive the request 310 for content and forward the request 310 for content to one of the servers 303 and 305. In the example shown in FIG. 3, the load balancer 302 forwards the request 310 for content to the server 303 via a transmission 315.

After receiving the transmission 315, the server 303 may process the request 310 for content, and respond to the request 310 for content by transmitting encrypted data 320 to the device 301. The server 303 and the device 301 may determine a session key for encrypting communications. For example, server 303 and device 301 may perform a key exchange, such as a Diffie-Hellman key exchange, to establish the session key. After establishing the session key, the server 303 may encrypt data using the session key, and transmit the encrypted data 320 to the device 301. The encrypted data 320 may be decrypted, by the device 301, using the session key.

The server 303 may also transmit session data to the device 301. In one example, the session data may be encrypted. The session data may comprise at least one of: user account information, a serial number associated with the device 301, timing information, and identification information associated with the server 303. The session data may enable the servers 303 and 305 to derive the session key. For example, the server 303 may transmit a secure data file comprising session data, an encryption key, a timestamp, or any combination thereof, to the device 301. In this example, the secure data file may be encrypted by a key, derivable by implementation of the key ladder stored at the shared server 340, accessible to the servers 303 and 305, but not accessible to the device 301. Steps that may be performed by the server 303 are further described below in regards to FIG. 5.

After transmitting the request 310 for content, the device 301 may transmit a second request 325 for content to the load balancer 302. In one example, the second request 325 for content may include client identification information and the secure session data received from the server 303. For example, the second request 325 for content may comprise a secure data file received from the server 303. In this example, the device 301 may never transmit the session key to the load balancer 302. As such, even if intercepted, the secure data file may be of little value to a hacker because the hacker would be unable to decrypt the secure data file and derive, from the session data comprising the secure data file, the session key. The session key may be the same session key derived by the server 303 in response to the transmission 315. Additionally, because the session data is transmitted by way of the secure data file, there is no need to maintain a central repository comprising the session data. This eliminates the risk of a security breach of the central repository that may reveal personal information associated with a plurality of users. Furthermore, maintaining this central repository 24/7 is a difficult task that may also be eliminated by use of the methods.

After receiving the second request 325 for content, the load balancer may determine which of the servers 303 and 305 to forward the request to. In the example shown in FIG. 3, the load balancer 302 may forward the second request 325 for content, to the server 305, via transmission 330. Although the second request 325 for content is shown as being routed to the server 305, it should be understood that any request for content may be directed or routed to any of the servers 303 and 305.

The server 305 may receive the second request 325 for content in the transmission 330, and, in response to the request, transmit data 335 to the device 301. The server 305 may derive the session key that was previously established between the server 303 and the device 301. In one example, the server 305 may transmit, to a shared server 340 capable of communicating with multiple other servers in the data center 300 and via the transmission 345, the client identification information. The shared server 340 may use the client identification information and a stored root value as inputs to a key ladder. The shared server 340 may use the stored key ladder to derive a decryption key. The server 340 may transmit, to the server 305 and via transmission 350, the decryption key.

The server 305 may use the decryption key to decrypt the secure data file received from the device 301. The secure data file may comprise the session key and/or secure session data. If the secure data file comprises secure session data, the server 305 may transmit the secure session data to the shared server 340. The shared server 340 may use the secure session data an input to the key ladder to derive the session key. The shared server 340 may transmit, to the server 305, the session key. Additionally or alternatively, the server 305 may store its own key ladder, and may use the key ladder and the secure data file to derive the session key. The process of deriving the session key, performed by the shared server 340 and/or the server 305, may expend less time and/or computation to perform than the key exchange performed between the server 303 and the device 301. The session key might not be transmitted between any of the device 301, the servers 303 and 305, or the load balancer 302. For example, rather than transmitting the session key from the device 301 to the server 305, the server 305 may derive, based on the secure data file, and/or may receive, from the shared server 340, the session key.

The session key may be used by the server 305 to authenticate the request received in transmission 330. The session key may be used to encrypt data 335. The server 305 may perform steps described below in regards to FIG. 5, which describes a method for deriving a session key.

Figure 4:
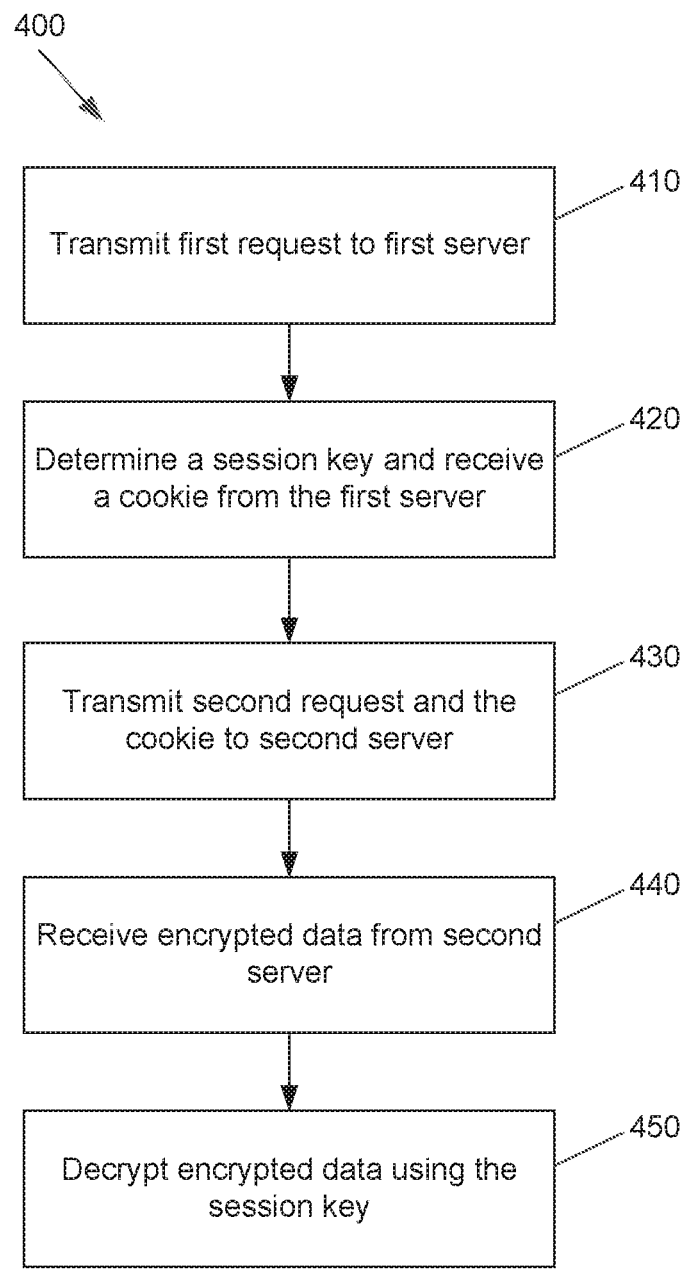
FIG. 4 is a flow diagram of a method for requesting and receiving encrypted data.

FIG. 4 is a flow diagram of a method 400 for requesting and receiving encrypted data. In one or more examples, the method 400 or one or more steps thereof may be performed by one or more computing devices or entities. For example, portions of the method 400 may be performed by components of the network 100 or the computing device 200. The method 400 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 410, a device, such as the device 301, may transmit a first request for content. For example, the device 301 may transmit the first request for content to the load balancer 302 or one of the servers 303 and 305. The first request for content may comprise a request for a movie, a television program, or audio content. The first request for content, transmitted at step 410, may be similar to the request 310 for content, described above and in FIG. 3. The first request for content may comprise an identifier of the device, such as a MAC address corresponding to the device. The first request for content may comprise an identifier of a user account associated with the device. The first request for content may comprise a timestamp. For example, the timestamp may indicate a time at which the first request for content was generated. In one example, the device 301 may receive a message from the server 305 requesting a secure session. In one example, the message may be a broadcast message transmitted to a plurality of computing devices. In another example, the message may comprise a unicast transmission to the device 301.

At step 420, the device may determine a session key via an exchange with the first server, and may receive, in response to authenticating the session key and from the first server, secure session data. For example, the session key may be determined in response to the first request for content. In one example, the device may work with the first server to determine, via a Diffie-Hellman public key exchange, the session key. The device may use the Diffie-Hellman public key exchange to initially establish the session key where a session key has not yet been established. In this example, both the device and the first server may have a common key stored. The device may have a first unique stored key. The first server may have a second unique stored key. The device may derive a first new unique key by combining the common key with the first unique stored key. The first server may derive a second new unique key by combining the common key with the second unique stored key. The device may then share, with the first server, the first new unique key, and the first server may share, with the device, the second new unique key. The device may derive a session key by combining the first unique stored key with the second new unique key, and the first server may derive the session key by combining the second unique stored key with the first new unique key. In this example, after performing the exchange, both the device and the first server will have the session key. In another example, the device and the server may exchange certificates comprising unique credentials. In this example, the device and the first server may each determine the session key based on the credentials. The session key may be a shared key between the device and the first server, such as a symmetrical key. This session key may be stored in a secure data file and decrypted by subsequent servers.

After the session keys are authenticated, a secure session may be established between the device and the first server, and the device may receive a secure data file containing the secure session data. The secure data file may be encrypted. In one example, the device receiving the secure data file might not be able to decrypt the secure data file. For example, if the device 301 received the secure data file from the server 303, the device 301 may be incapable of decrypting the secure data file. However, if the device 301 transmits the secure data file to one of the servers 303 and 305, they may be able to decrypt the secure data file. For example, a key corresponding to the secure data file may be stored at the servers 303 and 305. In this example, the key corresponding to the secure data file might not be stored at the device 301. The secure session data may comprise a session encryption key, a session authentication key, session data, a user identifier, a time, other system information, such as system information known to the servers, or any combination thereof. By having the key corresponding to the secure data file stored at the servers 303 and 305, the servers 303 and 305 may be able to reestablish the secure session with the device by decrypting the secure data file, and using the secure session data to derive the session key. By using this method to derive the secure session key, the server 305 may be able to reduce delay in establishing the secure session with the device 301, reduce computing power used to derive the session key, and is able to determine the secure session data without the need for a central repository, available to a plurality of servers, containing the secure session data. By eliminating the need for a central repository, this method reduces the likelihood of a security breech, eliminates the excessive time and cost needed to maintain the central repository, and allows for a more secure generation of an extended session key.

At step 430, the device may transmit a second request 325 for content. For example, at step 430, the device 301 may transmit the second request 325 for content to the load balancer 302, which may forward the request to the server 305. The second request 325 for content may be processed by the same server as the first request for content or by a different server. The second request 325 for content may comprise client identification information and the secure session data received at step 420. For example, the secure data file may be transmitted with the second request 325 for content. In another example, the device may authenticate the second request 325 for content with session security data, and then transmit the second request 325 for content to the server along with the secure data file.

The server that processes the second request 325 for content may derive the session key. For example, rather than performing a key exchange, the server processing the second request 325 for content may derive the session key using the secure session data. In one example, a key ladder may be used to derive the session key. In this example, the key ladder may be stored at a server shared by at least the servers 303 and 305, such as the shared server 340. The server 305 may transmit, to the shared server 340, client identification information such as an authenticated certificate/signature. The server 340 may have a stored root value, and may use the stored root value and authenticated certificate as initial inputs to the key ladder. The output from the key ladder may comprise a decryption key. The shared server 340 may transmit, to the server 305, the decryption key. The server 305 may then use the decryption key to decrypt the secure data file comprising the secure session data. The server 305 may use the secure session data to determine the session key. For example, the server 305 may use the secure session data as inputs to a key generation algorithm that may output the secure session key. The server 305 may also transmit the secure session data to the shared server 340 and may use the secure session data as additional inputs to the key ladder. The key ladder may generate the secure session key. In one example, by decrypting the secure data file, the server 305 may decrypt the session key.

After deriving the session key, the server may use the session key to validate the second request 325 for content. The server may decrypt the secure data file and apply the information contained within to validate the session security data used to authenticate the second request 325 for content. The server may use the session key to decrypt all or a portion of the second request 325 for content.

At step 440, the device may receive data responsive to the second request 325 for content. The data may be encrypted. For example, the data may be encrypted using the session key determined at step 420. The data may comprise content, such as audio or video content. For example, if the second request 325 for content, transmitted at step 430, was a request for a movie, the data received at step 440 may correspond to the movie.

At step 450, the device may decrypt the data received at step 440. For example, the data may be decrypted using the session key that was generated at step 420. The data may then be available for use by the device. For example, if content was requested at step 430, the content may be output for display at step 450.

Figure 5:
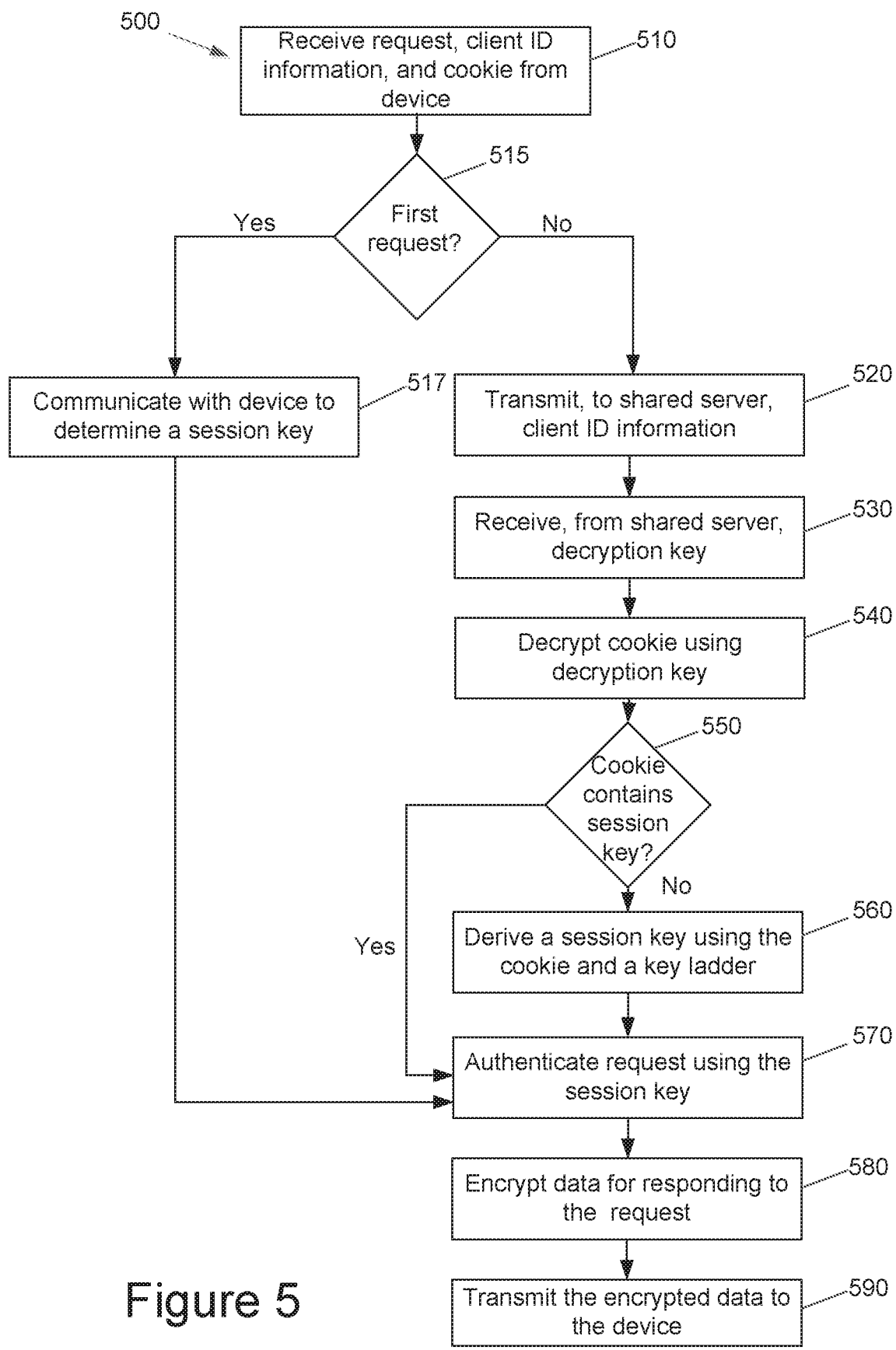
FIG. 5 is a flow diagram of a method for deriving a session key.

FIG. 5 is a flow diagram of a method 500 for deriving a session key. In one or more examples, the method 500 or one or more steps thereof may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 510, a server may receive a request for content. For example, the device 301 may transmit the second request 325 for content to the load balancer 302, which may be forwarded to the server 305 as transmission 330. The request for content may comprise client identification information and secure session data. For example, a secure data file comprising the secure session data may be transmitted with the request for content. The secure session data may have been previously generated by the server that receives the request for content, at step 510, or the secure session data may have been previously generated by a different server. For example, the secure session data may have been generated by the server 303 and transmitted to the device 301 in the encrypted data 320. In this example, the secure session data may then be transmitted to the server 305 at step 510. The secure session data may comprise a session encryption key, a session authentication key, session data, a user identifier, a time, other system information, such as system information known only to the servers, or combinations thereof.

At step 515, the server may determine the request, received at step 510, comprises a first request (a request to initially establish a secure session) or a subsequent request (a request to extend a secure session). The server may determine that a request comprises a subsequent request based on the presence of a secure data file in the request. If the request does not comprise a secure data file, the server may determine that the request comprises a first request to establish a secure session. If the request comprises a first request, the server may proceed to step 517. If the request comprises a subsequent request, the server may proceed to step 520.

At step 517, the server may communicate with the device, associated with the request for content, to determine a session key. The server and device may engage in a public key exchange protocol, such as a Diffie-Hellman handshake, to determine the session key. For example, the server 303 and the device 301 may determine the session key.

At step 520, the server may transmit, to a server, such as the shared server 340, capable of communication with other servers in given network, the client identification information. The client authentication information may comprise an authenticated certificate that identifies a device making the request for content. The client authentication information may also include a client signature which the shared server 340 may use to verify authenticity of the authenticated certificate. The shared server may use the client identification information to derive a decryption key as described below with regards to FIG. 6.

At step 530, the server may receive, from the shared server 340, a decryption key.

At step 540, the server may use the decryption key to decrypt the secure data file received at step 510.

At step 550, the server may determine if the secure data file comprises the session key. If the secure data file does comprise the session key, the server may proceed to step 570 to authenticate the request for content. If the secure data file does not comprise the session key, the server may proceed to step 560 to derive the session key.

At step 560, the server may derive the session key based on the secure session data decrypted above at step 540. The server may transmit, to the shared server 340, the secure session data, and the shared server 340 may input the secure session data into the key ladder used to derive the decryption key. The shared server 340 may derive the session key using a method similar to that described below with regards to FIG. 6. Alternatively or additionally, the server may have its own stored key ladder. The server may derive the session key using its own stored key ladder, or a combination of its own stored key ladder and the key ladder stored by the shared server 340.

Figure 6:
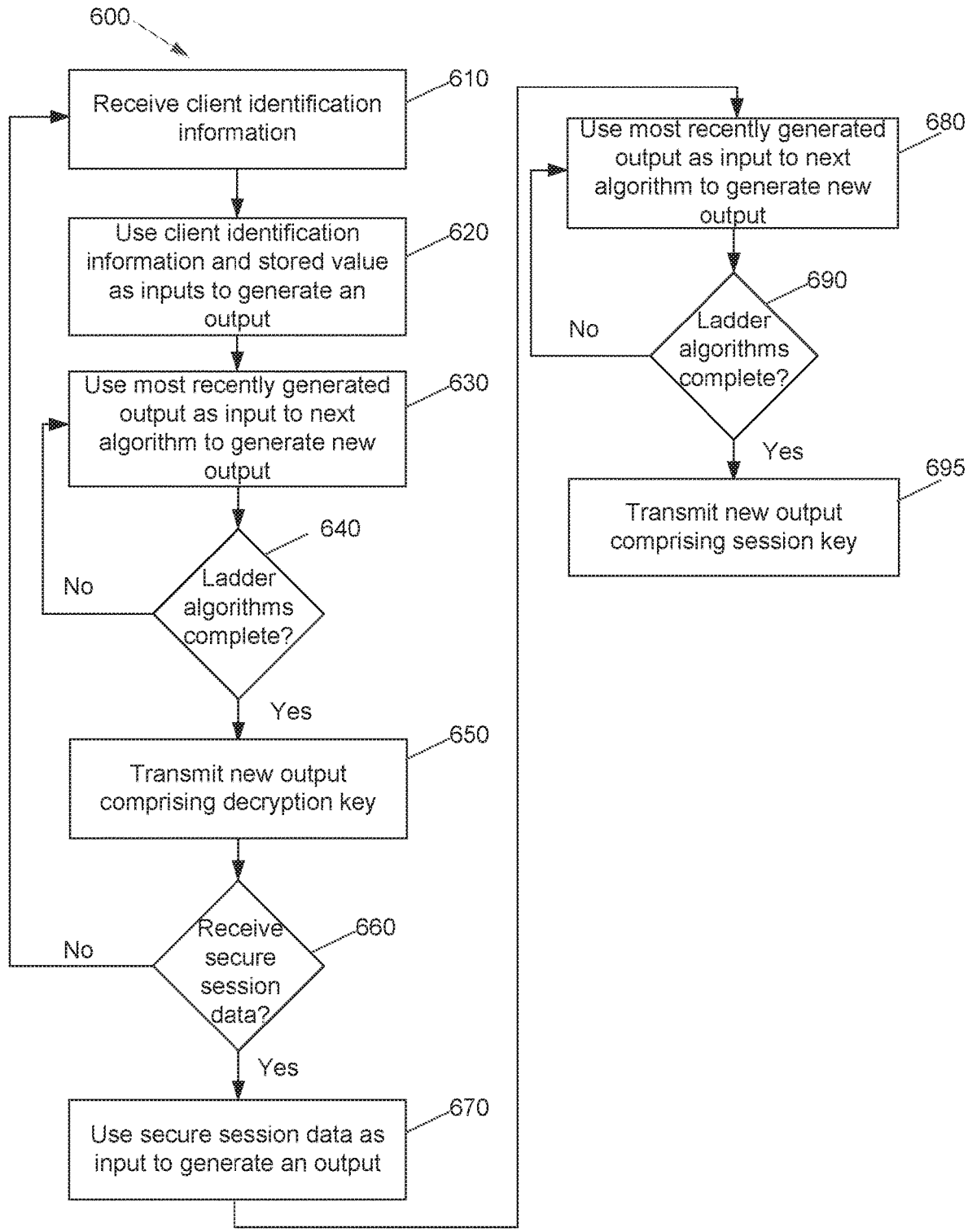
FIG. 6 is a flow diagram of a method for implementing a key ladder to determine a decryption key.

For example, a copy of the key ladder may be stored at a plurality of servers, and each of the plurality of servers may be configured to derive the session key upon receiving the secure session data. FIG. 6, described below, shows a method for deriving a session key using a key ladder. The server may use all or a portion of the secure session data to derive the session key. The server may use a MAC address associated with the request for content, a timestamp of the request for content, or other data to derive the session key. Although FIG. 5 describes using a key ladder to derive the session key, other methods may be used to derive the session key.

At step 570, the server may authenticate the request for content, received at step 510, using the session key determined at step 517 and/or derived at step 560/decrypted at step 540. For example, the server may decrypt the request for content using the session key, and apply the information contained within the request for content to validate session security data used to authenticate the request for content. The server may analyze a timestamp, received in the request for content, to determine whether the request for content has been retransmitted, e.g., during a playback attack. In one example, if the timestamp included in the request for content is not within a predetermined threshold of the current time, the server may determine that the request for content has been retransmitted, and may invalidate the request. In another example, the session security data may comprise a timestamp indicating when the secure data file was issued. In this example, the server may compare the secure data file timestamp with the timestamp of the request, and may determine whether the difference between the timestamps falls within a predetermined threshold. If the difference exceeds the predetermined threshold, the server may constrain the valid duration of an active session by forcing the old session key to expire, and may request that a new session be established. A session key may remain valid for, for example, a month. After the month expires, a new session key may be established via a new key exchange with a client device, such as the device 301.

At step 580, the server may encrypt data for responding to the request for content, received at step 510. For example, the data may be encrypted at the server 303 using the session key determined via the key exchange and/or at the server 305 using the derived session key.

At step 590, the server 305 may transmit the data encrypted at step 680 to the device. For example, the server 303 may transmit the encrypted data 320 directly to the device 301 and/or the server 305 may transmit the data 335 directly to the device 301. In this example, the encrypted data 320 and 335 may be the content requested by the device 301 in the request 310 for content and the second request 325 for content, respectively.

FIG. 6 is a flow diagram of a method 600 for implementing a key ladder to determine a decryption key. A server, such as the shared server 340, capable of communicating with a plurality of other servers may store the key ladder. In one or more examples, the method 600 or one or more steps thereof may be performed by one or more computing devices or entities. For example, portions of the method 600 may be performed by components of the network 100 or the computing device 200. The method 600 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 610, a server, such as the shared server 340, may receive client identification information such as a serial number of a client device or a secure certificate/signature authenticating the identity of the client device. The client identification information may comprise the client identification described above with regards to step 520.

At step 620, the shared server 340 may use a stored root value and the client identification information as inputs to the key ladder to generate a first decryption output. For example, the shared server 340 may use the stored root value in combination with a serial number of a client device to determine the first decryption output. The first decryption output may comprise a decryption key. The first decryption output may comprise a numeric value.

At step 630, the shared server 340 may use the first decryption output, determined at step 620, as an input to the key ladder. The key ladder may comprise a hierarchy of algorithms that generate an output based on an input. For example, the shared server 340 may execute the next algorithm in the key ladder to generate a second decryption output. This output may comprise a decryption key and/or a numeric value.

At step 640, the shared server 340 may determine if the key ladder comprises additional algorithms not yet executed. If so, the shared server 340 may revert back to step 630, and use the most recently generated output as an input to the next algorithm. This may result in generation of a new output. For example, the shared server 340 may use the second decryption output as an input to generate a third decryption output. If not, the shared server 340 may proceed to step 650. For example, the shared server 340 may determine that the second decryption output comprises the decryption key.

At step 650, the shared server 340 may transmit, to the server that transmitted the client identification information, such as the server 305, the final output from the key ladder. The final output may comprise a decryption key capable of decrypting the secure data file received by the second server at step 510. This decryption key may comprise the decryption key received, at step 530, by the second server.

At step 660, the shared server 340 may determine if it received, from the server that transmitted the client identification information, secure session data. This may comprise the secure session data decrypted, by the second server and using the decryption key, at step 540. The secure session data may be data that was previously generated by a server and transmitted to a device for storage. The device may store a session key. For example the secure session data may have been generated by the server 303 and transmitted, via the encrypted data 320, to the device 301. In this example, the device 301 may then transmit the secure session data with the second request 325 for content, which may be forwarded as transmission 330 to the server 305. After decrypting the secure session data, the server 305 may transmit, to the shared server, the secure session data. The secure session data may comprise a session encryption key, a session authentication key, session data, a user identifier, a time, other system information, such as system information known to the servers, or combinations thereof. If the shared server 340 did not receive the secure session data, it may revert back to step 610 and wait for additional client identification information. If the shared server 340 did receive secure session data, the shared server 340 may proceed to step 670 to determine a session key.

At step 670, the shared server 340 may use a stored key and the secure session data to determine an output, such as a second key. For example, the server may use the stored key in combination with a MAC address, a timestamp, a user identifier, other secure session data, or combinations thereof, to determine the second key. In this example, the stored key may comprise a shared key, a public key, or the decryption key generated above at step 630. In another example, the stored key may be any suitable value, such as a numeric value.

At step 680, the shared server 340 may use the second key, determined at step 670, and the secure session data as inputs to the key ladder to determine a new output, such as a third key. The new output may comprise a numeric value and/or the session key.

At step 690, the shared server 340 may determine if the key ladder comprises additional algorithms not yet executed. If so, the shared server 340 may revert back to step 680, and use the most recently generated output as an input to the next algorithm. This may result in generation of a new output. For example, the shared server 340 may use the third key as an input in the key ladder to generate a fourth key. The new output may comprise a numeric value and/or the session key. If not, the shared server 340 may proceed to step 695.

At step 695, the shared server 340 may transmit, to a second server such as the server 305, the session key. This may be the session key determined at step 560, and used to authenticate the request for content and encrypt data at steps 570 and 580 respectively. Thus, using method 600, a server may derive the session key stored at the device, without the device sending the session key to the server.

It should be understood that the key ladder shown in FIG. 6 is exemplary, and that a key ladder may comprise any number of tiers/algorithms. Additionally, any suitable data may be used by the key ladder to determine the decryption key and/or the session key.

Although examples are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   receiving, by a second server and from a computing device, a content request comprising:
      an encrypted session key configured for use in a previous secure session between a first server and the computing device; and
      key generation input information comprising identification information of the computing device, wherein the identification information of the computing device is one of a Media Access Control (MAC) address, a chassis serial number, and a CPU serial number;
   determining, based on the key generation input information, a decryption key;
   generating, using the decryption key and based on the encrypted session key, a decrypted session key;
   generating, based on the decrypted session key, encrypted content; and
   sending, to the computing device, the encrypted content.

2. The method of claim 1, wherein the content request comprises encrypted data in addition to the encrypted session key, and wherein the encrypted data is associated with the previous secure session.

3. The method of claim 2, wherein the previous secure session is associated with a previous request for the content, and wherein the encrypted data comprises data generated based on the previous request for the content.

4. The method of claim 2, wherein the encrypted data comprises data generated by a different server.

5. The method of claim 1, wherein the determining the decryption key comprises determining, using a key ladder, the decryption key.

6. The method of claim 1, wherein:
   the identification information of the computing device is the Media Access Control (MAC) address of the computing device; and
   the determining the decryption key comprises determining, based on the Media Access Control (MAC) address associated with the computing device, the decryption key.

7. The method of claim 1, wherein the identification information of the computing device is the Media Access Control (MAC) address of the computing device, and the determining the decryption key comprises:
   sending, to a shared server in communication with the server and a different server, the Media Access Control (MAC) address; and
   receiving, from the shared server, the decryption key, wherein the decryption key is based on the MAC address.

8. The method of claim 1, wherein the key generation input information is associated with the previous secure session of the computing device and comprises at least one of: a session encryption key, a session authentication key, a time, or a user identifier.

9. A system comprising:
   a first server comprising:
      one or more processors;
      memory storing instructions that, when executed by the one or more processors of the first server, cause the first server to:
         establish, with a computing device, a secure session, wherein communications for the secure session are based on a session key configured for use in the secure session; and
         send, to the computing device, an encrypted session key comprising an encrypted version of the session key; and
   a second server comprising:
      one or more processors; and
      memory storing instructions that, when executed by the one or more processors of the second server, cause the second server to:
         receive, from the computing device, a first request for first content, wherein the first request comprises the encrypted session key and key generation input information that comprises identification information of the computing device, wherein the identification information of the computing device is one of a Media Access Control (MAC) address, a chassis serial number, and a CPU serial number,
         determine, based on the key generation input information, a decryption key,
         generate, using the decryption key and based on the encrypted session key, the session key,
         generate, using the session key, encrypted content, and
         send, to the computing device, the encrypted content.

10. The system of claim 9, wherein the encrypted session key comprises data generated by the first server, and wherein the encrypted session key comprises additional encrypted data.

11. The system of claim 9, wherein the instructions stored in the memory of the second server, when executed by the one or more processors of the second server, cause the second server to determine the decryption key by:
   sending, to a shared server in communication with the first server and the second server, the key generation input information; and
   receiving, from the shared server, the decryption key, wherein the decryption key was generated by the shared server by using the key generation input information as an input to a stored key ladder.

12. The system of claim 9, wherein the encrypted session key comprises at least one of: a session encryption key or a session authentication key.

13. The system of claim 9, wherein the computing device is further configured to send, to the first server, a second request for second content.

14. The system of claim 13, wherein the identification information of the computing device comprises the Media Access Control (MAC) address of the computing device, and the second request comprises:
   encrypted data, in addition to the encrypted session key, generated based on the first request for first content,
   a timestamp, and
   the Media Access Control (MAC) address of the computing device.

15. A method comprising:

establishing, by a computing device and with a first server, a secure session, wherein communications for the secure session are based on a session key configured for use in the secure session;

receiving, by the computing device and from the first server, an encrypted session key comprising an encrypted version of the session key;

determining, by the computing device, device identification information of the computing device, wherein the identification information of the computing device is one of a Media Access Control (MAC) address, a chassis serial number, and a CPU serial number;

sending, by the computing device and to a second server, a request for content, wherein the request comprises the encrypted session key and key generation input information, which comprises the device identification information, for determining a decryption key to decrypt the encrypted session key;

receiving, after sending the request and from the second server, encrypted content wherein the encrypted content is based on the session key;

decrypting, using the session key, the encrypted content; and outputting, for display, the content.

16. The method of claim 15, further comprising transmitting, to the second server, a different request for content, wherein the different request comprises at least one of the Media Access Control (MAC) address or a timestamp.

17. The method of claim 15, wherein the encrypted session key comprises at least one of: a session encryption key or a session authentication key.

18. The method of claim 15, wherein the encrypted session key comprises data encrypted by a second session key.

19. The method of claim 15, wherein the sending, to the second server, the request for content comprises sending encrypted data comprising the encrypted session key.

20. The method of claim 19, wherein the encrypted data comprises data, in addition to the encrypted session key, generated by the first server.

* * * * *

UNITED STATES PATENT AND TRADEMARK OFFICE
CERTIFICATE OF CORRECTION

PATENT NO. : 11,418,364 B2
APPLICATION NO. : 15/615930
DATED : August 16, 2022
INVENTOR(S) : Tang It is certified that error appears in the above-identified patent and that said Letters Patent is hereby corrected as shown below:

In the Specification

Column 2, Detailed Description, Line 41:
Delete "105-07." and insert --105-107.-- therefor Column 2, Detailed Description, Line 64:
Delete "105-07" and insert --105-107-- therefor Column 4, Detailed Description, Line 29:
Delete "110-17." and insert --110-117.-- therefor Column 4, Detailed Description, Line 31:
Delete "110-17." and insert --110-117.-- therefor Column 4, Detailed Description, Line 32:
Delete "110-17" and insert --110-117-- therefor Column 4, Detailed Description, Line 41:
Delete "110-17" and insert --110-117-- therefor Column 4, Detailed Description, Line 46:
Delete "110-17." and insert --110-117.-- therefor Column 4, Detailed Description, Line 57:
Delete "110-17." and insert --110-117.-- therefor Column 6, Detailed Description, Line 28:
After "305.", delete "¶"

Column 7, Detailed Description, Line 4:

Signed and Sealed this
Third Day of October, 2023

Katherine Kelly Vidal
*Director of the United States Patent and Trademark Office*

Delete "110-17," and insert --110-117,-- therefor

In the Claims

Column 17, Line 20:
In Claim 15, after "content", insert --,--